(12) United States Patent
Tokuchi

(10) Patent No.: US 10,356,280 B2
(45) Date of Patent: Jul. 16, 2019

(54) INFORMATION PROCESSING DEVICE, TRANSFER SYSTEM, INFORMATION PROCESSING METHOD, AND NON-TRANSITORY COMPUTER-READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 58 days.

(21) Appl. No.: 15/368,799

(22) Filed: Dec. 5, 2016

(65) Prior Publication Data

US 2017/0331980 A1 Nov. 16, 2017

(30) Foreign Application Priority Data

May 13, 2016 (JP) ................................. 2016-097346

(51) Int. Cl.
*G06F 3/12* (2006.01)
*H04N 1/44* (2006.01)
(Continued)

(52) U.S. Cl.
CPC .......... *H04N 1/444* (2013.01); *G06F 3/1203* (2013.01); *G06F 3/1247* (2013.01); *G06F 3/1273* (2013.01); *G06F 3/1288* (2013.01); *G06F 3/1297* (2013.01); *G06F 16/23* (2019.01); *G06F 16/258* (2019.01); *G06F 16/58* (2019.01); *G06F 21/608* (2013.01); *H04N 1/00145* (2013.01); *H04N 1/00344* (2013.01); *H04N 1/32144* (2013.01); *H04N 1/4413* (2013.01); *G06F 3/1222* (2013.01); *G06F 3/1238* (2013.01); *G06Q 30/0601* (2013.01); *H04N 2201/0094* (2013.01); *H04N 2201/3205* (2013.01); *H04N 2201/3207* (2013.01); *H04N 2201/3232* (2013.01); *H04N 2201/3235* (2013.01); *H04N 2201/3246* (2013.01)

(58) Field of Classification Search
CPC ............... H04N 1/444; H04N 1/00145; H04N 1/32144; H04N 1/4413; H04N 1/00344; H04N 2201/3205; H04N 2201/0094; H04N 2201/3235; G06F 3/1247; G06F 3/1288; G06F 3/1297; G06F 21/608; G06F 17/30345; G06F 17/30569; G06Q 30/0601

See application file for complete search history.

(56) References Cited

U.S. PATENT DOCUMENTS

| 2003/0204449 A1 | 10/2003 | Kotas et al. |
| 2004/0103055 A1 | 5/2004 | Butler |

(Continued)

FOREIGN PATENT DOCUMENTS

| JP | 2004-504955 A | 2/2004 |
| JP | 2005-508038 A | 3/2005 |

(Continued)

OTHER PUBLICATIONS

Communication dated Jul. 4, 2017, issued by the Japanese Patent Office in counterpart Japanese application No. 2016-209698.

(Continued)

*Primary Examiner* — Kent Yip
(74) *Attorney, Agent, or Firm* — Sughrue Mion, PLLC

(57) ABSTRACT

An information processing device includes a linker that links respective identification information of one or more persons and an object involved in a transfer established using a network, and an updater that updates the respective identification information for a subsequent transfer transaction.

14 Claims, 13 Drawing Sheets

| COMMON ATTRIBUTE INFORMATION | (a) COMMON CARD ID: CARD A |
| | (b) MAXIMUM NUMBER AVAILABLE TO PRINT: 10 |
| | (c) REMAINING NUMBER AVAILABLE TO PRINT: 7 |

| | SERIAL NUMBER | ATTRIBUTE ITEM AND ATTRIBUTE VALUE |
|---|---|---|
| INDIVIDUAL ATTRIBUTE INFORMATION | 1 | (1) INDIVIDUAL CARD ID: CARD A<br>(2) OWNER ID: USER A<br>(3) PRINT ORDER: 1<br>(4) PRINT TIME: m1/d1/yyy1 h1:m1<br>(5) PRINT LOCATION: TOKYO<br>(6) PASSWORD: 1234<br>(7) EMBEDDED INFORMATION: (1), (3)–(6) |
| | 2 | . . . |
| | 3 | . . . |
| | : | |

(51) Int. Cl.
*G06F 16/23* (2019.01)
*G06F 16/25* (2019.01)
*G06F 21/60* (2013.01)
*H04N 1/00* (2006.01)
*H04N 1/32* (2006.01)
*G06F 16/58* (2019.01)
*G06Q 30/06* (2012.01)

(56) References Cited

U.S. PATENT DOCUMENTS

2014/0304048 A1* 10/2014 Asselin-Normand ........................ G06Q 30/08
705/14.22
2016/0300234 A1* 10/2016 Moss-Pultz ............. G06F 21/10

FOREIGN PATENT DOCUMENTS

| JP | 2007-080075 A | 3/2007 |
| JP | 2007-249535 A | 9/2007 |
| WO | 02/09830 A1 | 2/2002 |

OTHER PUBLICATIONS

Communication dated Jul. 4, 2017, issued by the Japanese Patent Office in counterpart Japanese application No. 2016-209699.
Communication dated Feb. 14, 2017, from the Japanese Patent Office in counterpart Japanese application No. 2016-209698.
Communication dated Feb. 21, 2017 from the Japanese Patent Office in counterpart Japanese application No. 2016-209699.

* cited by examiner

FIG. 6

| COMMON ATTRIBUTE INFORMATION | | (a) COMMON CARD ID: CARD A<br>(b) MAXIMUM NUMBER AVAILABLE TO PRINT: 10<br>(c) REMAINING NUMBER AVAILABLE TO PRINT: 7 |
|---|---|---|
| INDIVIDUAL ATTRIBUTE INFORMATION | SERIAL NUMBER | ATTRIBUTE ITEM AND ATTRIBUTE VALUE |
| | 1 | (1) INDIVIDUAL CARD ID: CARD A<br>(2) OWNER ID: USER A<br>(3) PRINT ORDER: 1<br>(4) PRINT TIME: m1/d1/yyy1 h1:m1<br>(5) PRINT LOCATION: TOKYO<br>(6) PASSWORD: 1234<br>(7) EMBEDDED INFORMATION: (1), (3)−(6) |
| | 2 | . . . |
| | 3 | . . . |
| | ⋮ | |

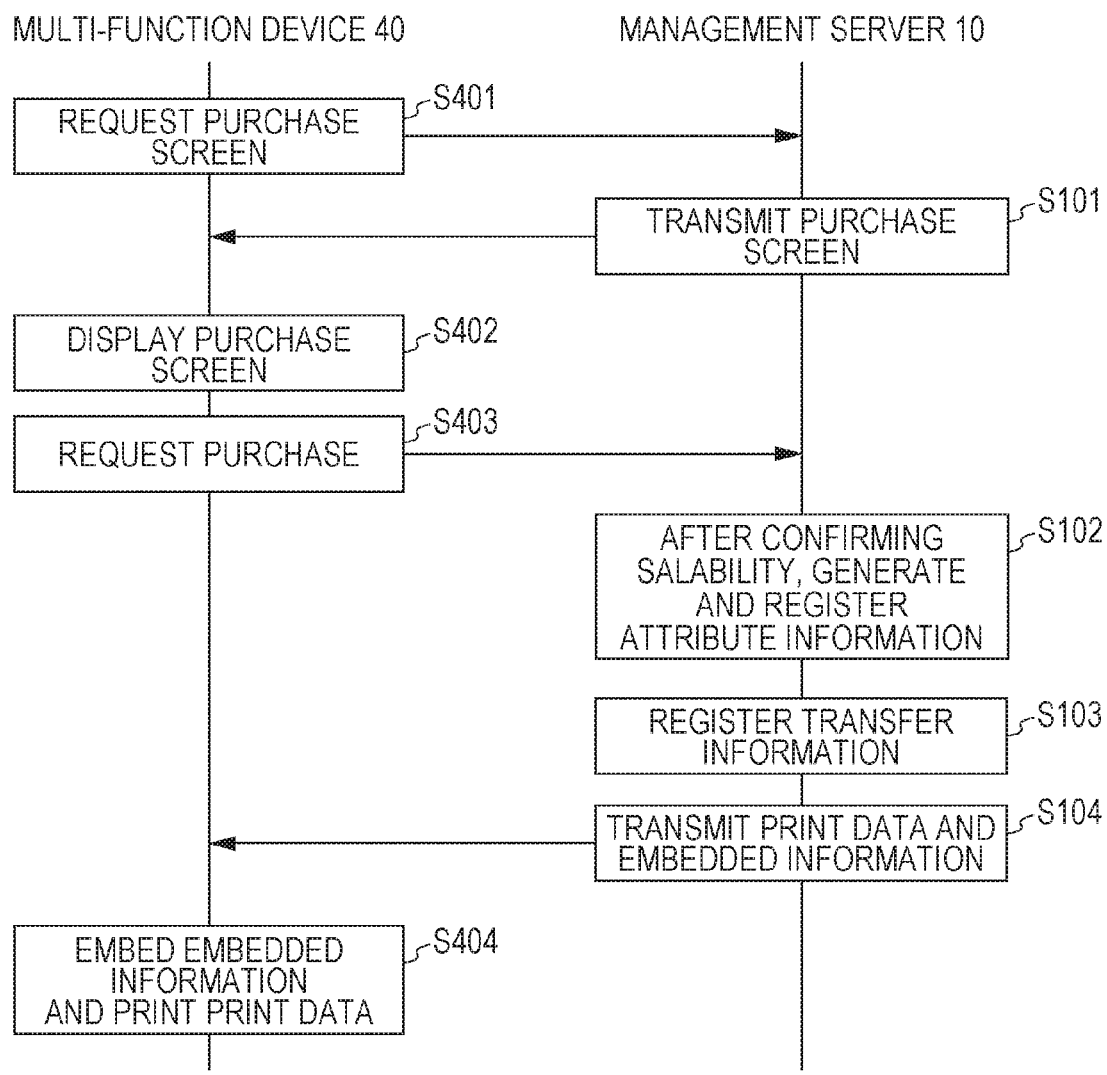

FIG. 8

| TRANSFER TIME | CARD ID | TRANSFERRER | TRANSFEREE | TRANSACTION INFORMATION | |
|---|---|---|---|---|---|
| m1/d1/yyy1 h1: m1 | CARD A | MANAGEMENT SERVER | USER A | | ~3 |
| m2/d2/yyy1 h2: m2 | CARD R | USER A | USER D | | ~4 |
| m3/d3/yyy1 h3: m3 | CARD A | USER A | USER F | | ~5 |
| ⋮ | | | | | |

FIG. 10

| ITEM | ITEM VALUE |
|---|---|
| CARD NAME | CARD C |
| OWNER ID | userA |
| CONTACT INFORMATION | userA@a.com |
| PRINT ORDER | IN TOP 5 |
| PRESERVATION CONDITION | SHARP |
| DESIRED SALE PRICE | ¥1000－¥2000 |
| DELIVERY AVAILABILITY | WITHIN 3 DAYS |
| PAYMENT METHOD | BANK TRANSFER OR CREDIT CARD |
| SHOW NAME | SHOW |
| TRANSACTION CONDITION | LIMITED TO RESIDENTS OF METROPOLITAN AREA |
| ACQUISITION ROUTE | MANAGEMENT SERVER |
| ⋮ | |

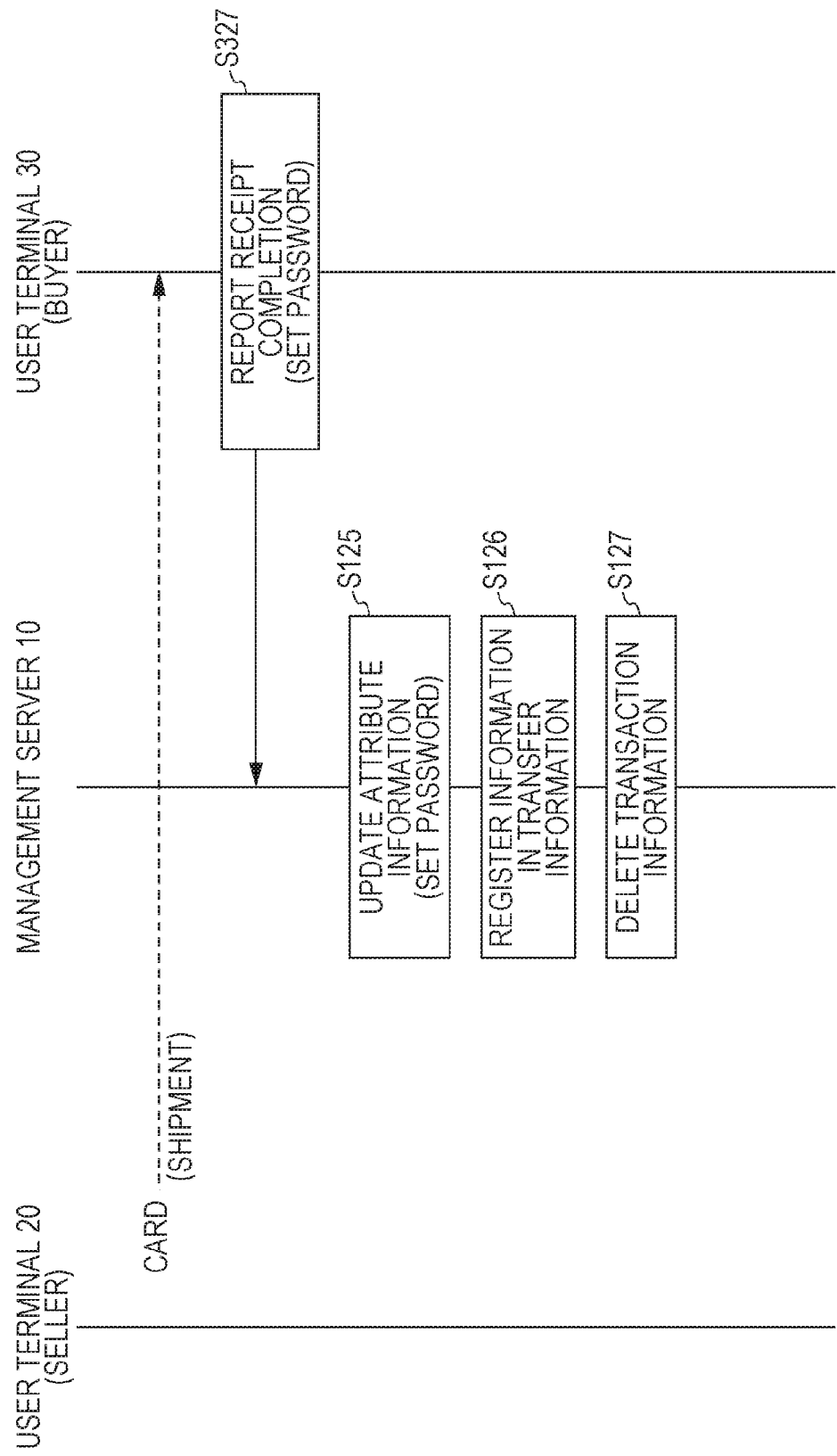

CARD C

10/10
PRINTED COPIES

<PRINTING ENDED>

| OWNER LIST | TRANSACTION CONDITION | | TRANSACTION OFFER |
|---|---|---|---|
| | PRICE | REMARKS | |
| MR. A | ¥1000 | LIMITED TO RESIDENTS OF METROPOLITAN AREA | (OFFER) |
| (HIDDEN) | — | EXCHANGE WITH CARD B | (OFFER) |
| MR. E | ¥1200 | — | (OFFER) |
| (HIDDEN) | — | — | — |
| ⋮ | | | | ns # INFORMATION PROCESSING DEVICE, TRANSFER SYSTEM, INFORMATION PROCESSING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2016-097346 filed May 13, 2016.

BACKGROUND

Technical Field

The present invention relates to an information processing device, a transfer system, an information processing method, and a non-transitory computer-readable medium.

SUMMARY

According to an aspect of the invention, there is provided an information processing device including a linker that links respective identification information of one or more persons and an object involved in a transfer established using a network, and an updater that updates the respective identification information for a subsequent transfer transaction.

BRIEF DESCRIPTION OF THE DRAWINGS

An exemplary embodiment of the present invention will be described in detail based on the following figures, wherein:

FIG. 6 is a diagram illustrating an example of the data structure of attribute information stored in attribute information storage according to an exemplary embodiment;

FIG. 7 is a flowchart illustrating a flow of a process when purchasing a transferrable object according to an exemplary embodiment;

FIG. 8 is a diagram illustrating an example of the data structure of transfer information registered in transfer information storage according to an exemplary embodiment;

FIG. 10 is a diagram illustrating an example of the data structure of transaction information held in trade management information storage according to an exemplary embodiment;

FIG. 11B is a flowchart illustrating the continuation of FIG. 11A;

DETAILED DESCRIPTION

Hereinafter, an exemplary embodiment of the present invention will be described on the basis of the drawings.

Figure 1:
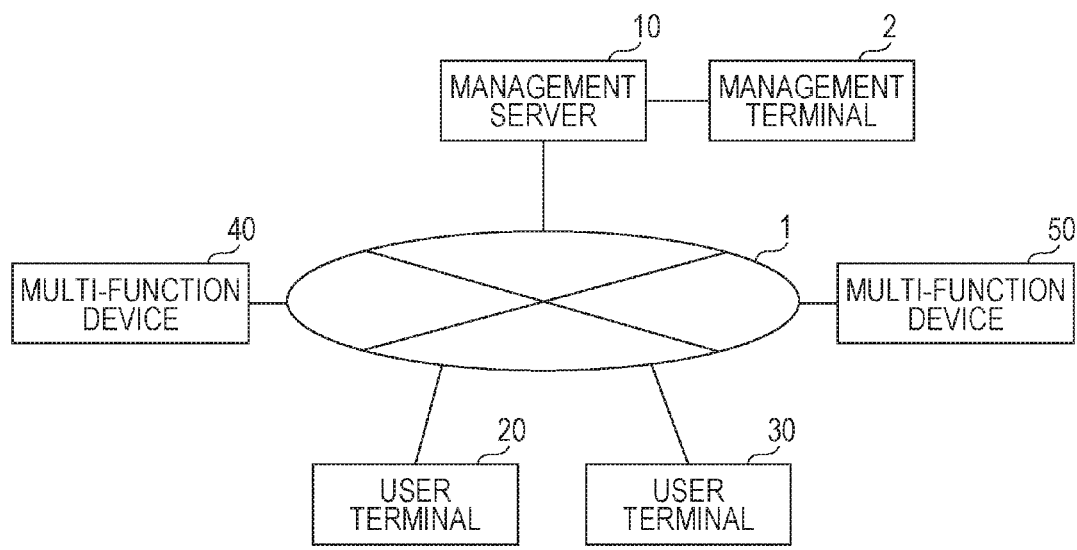
FIG. 1 is an overall configuration diagram illustrating an exemplary embodiment of a transfer system according to the present invention.

FIG. 1 is an overall configuration diagram illustrating an exemplary embodiment of a transfer system according to the present invention. FIG. 1 illustrates a configuration in which a management server 10 connected to a management terminal 2, user terminals 20 and 30, and multi-function devices 40 and 50 are connected to each other over a network 1.

Herein, "transfer" refers to the assignment of a right or asset, legal status, or the like to another person, which may be carried out with or without compensation. In the exemplary embodiment, transfer without compensation is not excluded, but unless specifically noted otherwise, the description herein supposes transactions of buying and selling with compensation.

The management server 10 is an exemplary embodiment of an information processing device according to the present invention, and manages transferrable objects. In the exemplary embodiment, an example is described in which the transferrable objects are print data transferrable over the network 1 or printouts of such print data, such as celebrity photographs or trading cards. The management terminal 2 is a terminal device used by a person such as an administrator when performing actions on the management server 10 such as setting and registering information relevant to the management of transferrable objects, or configuring environmental settings, for example.

The multi-function devices 40 and 50 are image forming devices used for printing or determining the authenticity of print data. The installation location of the multi-function devices 40 and 50 is not particularly limited, but the description of the exemplary embodiment herein supposes a shop usable by the general public, such as a convenience store. Each of the multi-function devices 40 and 50 may have similar onboard functions, but in the exemplary embodiment, for the sake of convenience, the multi-function device 40 is described as being used to print out print data newly purchased from the management server 10, whereas the multi-function device 50 is described as being used to determine the authenticity of print data that has already been purchased and printed out, or in other words, printed matter.

The user terminals 20 and 30 are terminal devices used by users who trade transferrable objects. Since the user of each of the user terminals 20 and 30 may be a new purchaser of a transferrable object as well as a buyer and seller of printed matter created by printing out after purchasing, both of the user terminals 20 and 30 have similar onboard functions. However, in the exemplary embodiment, for the sake of convenience, the user terminal 20 is described as being used by a user who purchases and prints out print data or a user who acts as a seller of printed matter, whereas the user terminal 30 is described as being used by a user who acts as a buyer of printed matter. The user of the user terminal 20 is the transferee and thus also the owner of printed matter when newly purchasing printed matter from the management server 10 (which corresponds to the transferrer). When the user of the user terminal 20 desires to sell, the user becomes the seller, namely, a person who desires to make a transfer, and after a sale is established, the user becomes the seller, namely, the transferrer. On the other hand, when the user of the user terminal 30 desires to buy, the user is the buyer, namely, a person who desires to receive a transfer, and after a buy is established, the user becomes the transferee and thus also the (new) owner.

As discussed above, in the exemplary embodiment, print data is described as an example of a transferrable object, but the print data which is bought and sold is printed out by the purchaser using the multi-function device 40 to form printed matter. After that, reuse (re-printing) of the print data is unavailable as a general rule, and the printed matter formed by printing out the print data becomes an actual transferrable object which may be transferred normally in the market. In addition, it is supposed that an upper limit is set on the number of times that print data may be printed, thereby ensuring the rarity of the print data.

Figure 2:
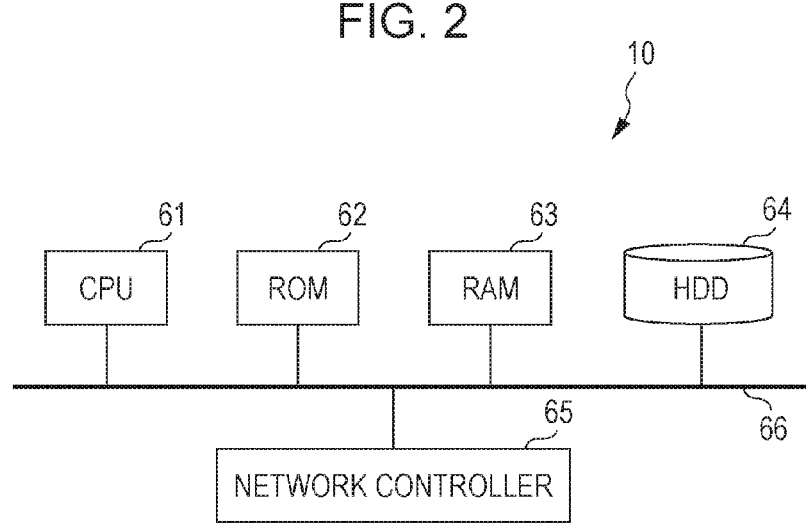
FIG. 2 is a hardware configuration diagram of a server computer that forms a management server according to an exemplary embodiment.

FIG. 2 is a hardware configuration diagram of a server computer that forms the management server 10 according to the exemplary embodiment. In the exemplary embodiment, the server computer that forms the management server 10 may be realized by an existing general-purpose hardware configuration. In other words, the computer is configured by a CPU 61, ROM 62, RAM 63, a hard disk drive (HDD) 44, and a network controller 65 provided as a communication device, the above components being interconnected by an internal bus 66. Obviously, other components may also be added to the hardware configuration as appropriate. For example, an input/output controller respectively connected to a mouse and a keyboard provided as input devices, and a display provided as a display device, may also be connected to the internal bus 66.

In addition, the user terminals 20 and 30 may be realized by an existing general-purpose hardware configuration, such as a personal computer (PC). The hardware configuration is likewise a computer and thus may be similar to the management server 10, but is equipped with components such as an input device and a display device for use by a user.

Figure 3:
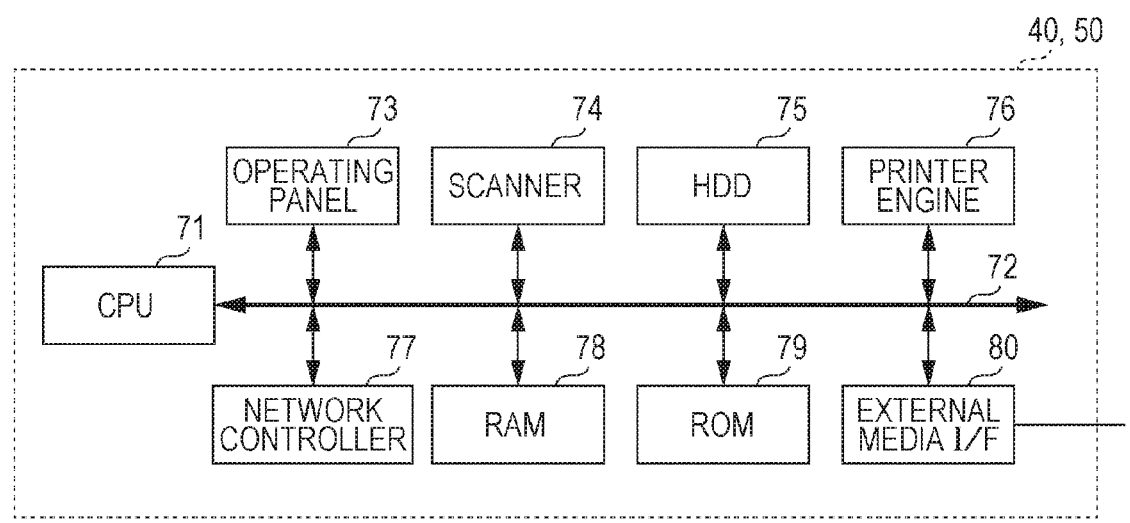
FIG. 3 is a hardware configuration diagram of an image forming device according to an exemplary embodiment.

FIG. 3 is a hardware configuration diagram of the multi-function devices 40 and 50 according to the exemplary embodiment. Each of the multi-function devices 40 and 50 is an exemplary embodiment of an image forming device equipped with various onboard functions, such as a copy function and a scanner function, and is a device with a built-in computer. In FIG. 3, a CPU 71 follows a program stored in ROM 79 to control the operations of various mechanisms installed onboard the device itself, such as a scanner 74 and a printer engine 76. An address data bus 72 connects to the various mechanisms under the control of the CPU 71 and conducts data communication. An operating panel 73 accepts instructions from the user, and displays information. The scanner 74 scans documents set by the user, and stores scanned documents in the hard disk drive (HDD) 75 or the like as electronic data. The HDD 75 stores information such as electronic documents scanned using the scanner 74. The printer engine 76 prints images onto output sheets by following instructions from a control program executed by the CPU 71. A network controller 77 connects to the network 1 or the management terminal 2, and is used for actions such as transmitting electronic data generated by the device itself, and providing access to the device itself through a browser. The RAM 78 is used as a work memory during the execution of a program, and as a transmission buffer during the transmitting and receiving of electronic data. The ROM 79 stores various programs related to control of the device itself, data communication, and the like. By executing various programs, each of the structural elements discussed later exhibits a certain processing function. The external media interface (I/F) 80 is an interface with external memory devices such as USB memory and flash memory.

Figure 4:
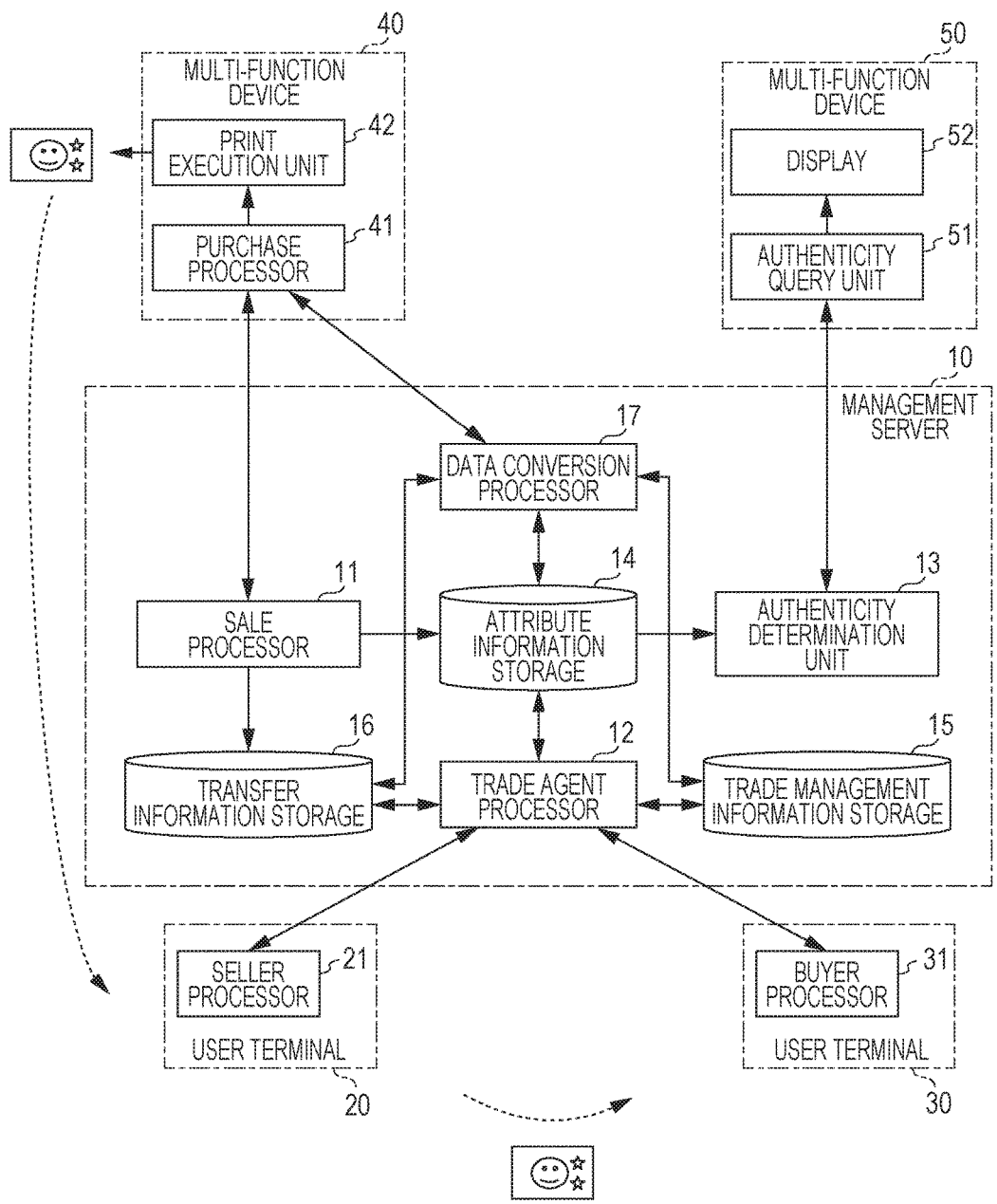
FIG. 4 is a block configuration diagram of a transfer system according to an exemplary embodiment.

FIG. 4 is a block configuration diagram of a transfer system according to the exemplary embodiment. Note that in FIG. 4, structural elements not used in the description of the exemplary embodiment are omitted from FIG. 4. The management server 10 includes a sale processor 11, a trade agent processor 12, an authenticity determination unit 13, attribute information storage 14, trade management information storage 15, transfer information storage 16, and a data conversion processor 17. The sale processor 11 conducts sale processing, such as selling print data in response to a purchase request (transfer request) from a user, and information processing including the update of attribute information for sold print data. The sale processor 11 functions as a linker that links the respective identification information of persons and objects involved in a transfer established using the network 1, and as an updater that updates the respective identification information for subsequent transfer transactions. Additionally, as discussed later in detail, in the exemplary embodiment, an upper limit is set on the number of copies of print data that may be sold to ensure rarity, and the sale processor 11 also functions as a prohibitor that prohibits transfers exceeding the maximum transferrable limit for print data of the same type.

The trade agent processor 12 executes an agent process for the trade of sold print data (printed matter). Particularly, the trade agent processor 12 functions as a linker and an updater, similarly to the sale processor 11. Additionally, the trade agent processor 12 also functions as a presenter that presents transaction information to a person who desires to receive a transfer during a trade, as an acquirer that acquires position information about the person who desires to receive the transfer of a transferrable object, and as an permitter that permits a transfer only to persons desiring to receive transfer in a geographical region matching a transfer condition on the transferrable object.

In the case in which the transferrable object is printed matter like in the exemplary embodiment, the authenticity determination unit 13 functions as an authenticity determiner that determines the authenticity of the printed matter in response to a query including printed matter information scanned from the printed matter, by verifying the printed matter information against attribute information stored in the attribute information storage 14. Additionally, the authenticity determination unit 13 also functions as a replier that replies to the source of the query with the attribute information of the printed matter extracted from the attribute information storage 14 based on the printed matter information in response to the query including printed matter information scanned from the printed matter.

Figure 5:
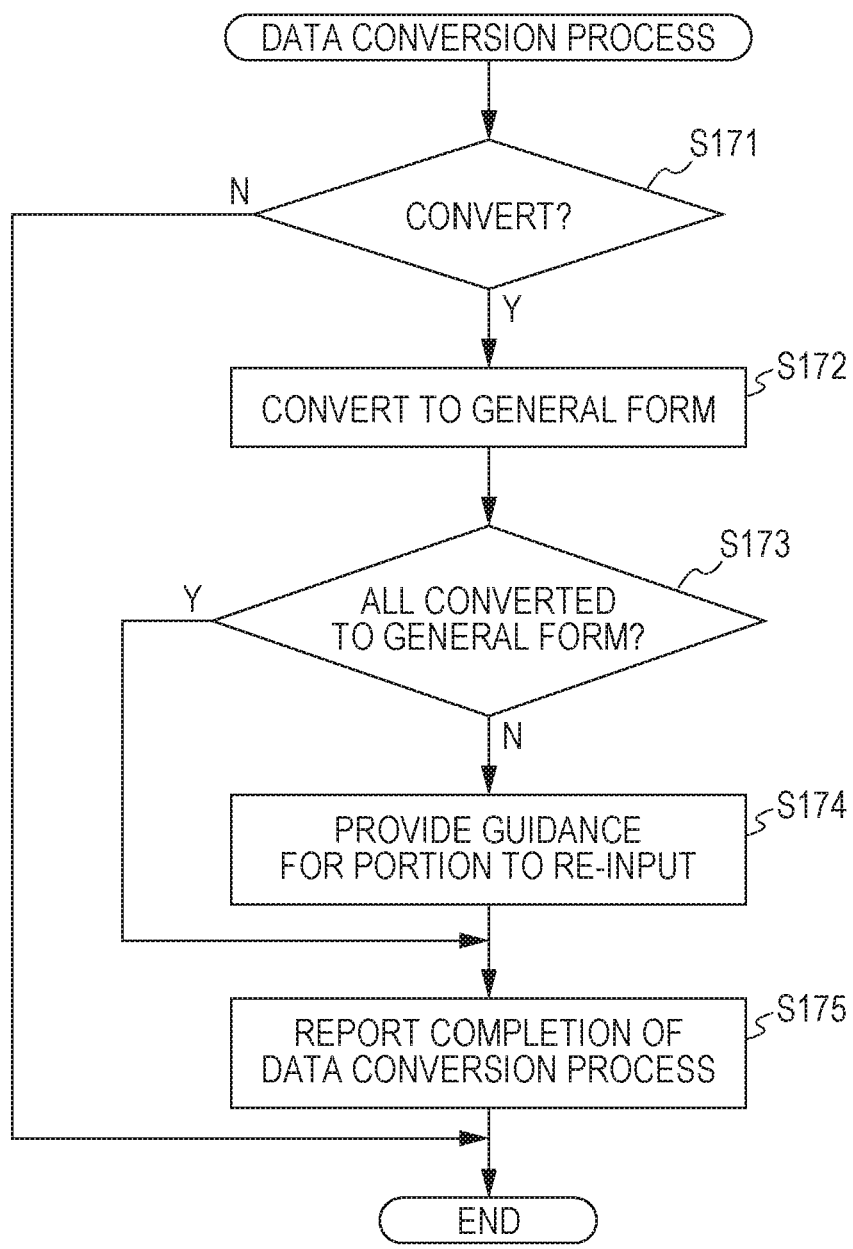
FIG. 5 is a flowchart illustrating operations of a data conversion processor according to an exemplary embodiment.

The data conversion processor 17 functions as a converter that converts respective identification information into a format that may be updated for a subsequent transfer transaction. FIG. 5 illustrates a process flow when passing data to the data conversion processor 17. The data conversion processor 17 judges to convert data if there is a discrepancy in the data format between the system used to input at the time of purchase and the system that saves data, or if there is a discrepancy in the data format when citing data from the system that saved the data in order to register attribute information in another system at the time of sale (step 171, Y). In the case of judging to convert the data, the data conversion processor 17 converts the data format to general-purpose data that is readable at the saving destination and the citing destination (step 172). On the other hand, if data conversion is unavailable (step 173, N), the data conversion processor 17 notifies the user of which portions to re-input (step 174). Subsequently, when the data conversion process is completed, the data conversion processor 17 notifies the user (step 175).

By providing the data conversion processor 17 in this way, even if systems (equipment) are different from each other (the difference may be the difference between an old system and a new system, or the difference between an in-house system and another company's system, for example), the user is still able to save and hand over data easily. Note that when notifying a user, the method of notification is not limited, and the notification may be displayed on a display provided in equipment operated by the user, printed onto paper, or delivered to an email or messaging address, for example. Obviously, in cases in which the system is integrated in a specific manner, such a data conversion processor 17 may also not be provided, and processing may be sped up by omitting the data conversion processor 17.

Meanwhile, if the printed matter acting as the transferrable objects is objects such as celebrity photographs or trading cards (hereinafter collectively designated "cards"), like in the exemplary embodiment, there is a possibility that multiple cards of the same type may be sold. In other words, the term "card" may refer to a specific type of card, or refer to the individual cards themselves. Accordingly, in the exemplary embodiment, to avoid confusion of terminology, the term "card type" will be used particularly to refer to a specific type of card, whereas the term "card" will be used to refer to the individual cards themselves.

Note that the content that is actually printed onto a celebrity photograph or card may be an image depicting the face or a full-length portrait of a celebrity, or printed matter of a comic book, animation, or video game character, for example. Additionally, a local mascot or character (a presence used to promote a particular geographical region), a landscape of a geographical region, a historic building or structure, and the like may also be adopted as printed content. In particular, content (products) linked to a geographical region have a tendency to rise in scarcity value due to being unavailable for purchase elsewhere. These characteristics are being utilized successfully to provide content services that are only available for sale and printing in a specific geographical region. Likewise, with the present invention, by using position information about the user or the multi-function device, application to such a region-specific content print service is also possible.

FIG. 6 is a diagram illustrating an example of the data structure of attribute information stored in the attribute information storage 14 according to the exemplary embodiment. In the attribute information storage 14, respective item values of attribute information for a transferrable object are stored. Attribute information in the exemplary embodiment includes common attribute information and individual attribute information. Common attribute information is attribute information shared in common with all cards of the same type, while individual attribute information is attribute information set for each card individually. The common attribute information includes a common card ID, a maximum number available to print, and a remaining number available to print. The common card ID is identification information that identifies the relevant card type. The maximum number available to print is the number of printable copies of the relevant card type, and is an upper limit on the number of printed copies of the relevant card type. Note that when print data is transmitted to the multi-function device 40 as a result of being sold, it is assumed that the print data is printed immediately by the multi-function device 40, and for this reason, the terms "print" and "sale" are used synonymously herein. The remaining number available to print is the maximum number of printable copies of the relevant card type, minus the number of copies already sold. According to the example configuration of the attribute values illustrated in FIG. 6, three out of ten salable cards have been sold, thus indicating that seven cards currently are available for sale. The common card ID and the maximum number available to print are set in advance by an administrator or the like.

Note that besides the above, other attribute information related to the card type, such as a name assigned to the card type and the distributor of the card type, may also be set as common attribute information, but such information is omitted from FIG. 6.

The individual attribute information is attribute information set individually for each sold card, and includes an individual card ID, an owner ID, a print order, a print time, a print location, a password, and embedded information. The individual card ID is identification information that identifies the relevant card. The owner ID is set with identification information of the owner of the relevant card (user ID). The print order is set with the order in which the relevant card was printed from among the relevant card type. In the exemplary embodiment, a serial number proceeding in the printed order is assigned to each set of individual attribute information, and thus the serial number and the print order are the same. The print time is set with the time at which the relevant card was printed. Note that the order of printing may also be specified by referencing the print time of each card. The print location is set with the location where the relevant card was printed. Since the card is printed by the multi-function device 40, the installation location of the multi-function device 40 is set. The password is set with a password assigned to the relevant card by the owner when a user becomes the owner of the relevant card. The password may be optional. The embedded information includes information that is printed embedded into the card (printed matter). In the exemplary embodiment, the individual card ID, the print order, the print time, the print location, and the password discussed above are included in the embedded information. The owner ID may also be included, but the embedded information embedded by printing onto the printed matter is not updated, even though there is a possibility of the owner changing by transfer. For this reason, the owner ID is not included in the embedded information in the exemplary embodiment. In addition, the common attribute information may also be included in the embedded information if it is acceptable to reveal such information to the owner.

Note that the trade management information storage 15 and the transfer information storage 16 are created during the trade agent process, and thus will be described together with the trade agent process.

Each of the structural elements 11 to 13 and 17 in the management server 10 are realized by cooperative action between the computer that forms the management server 10 and a program running on the CPU 61 installed in the computer. Additionally, each of the storage units 14 to 16 is realized by the HDD 64 installed in the management server 10. Alternatively, the RAM 63 may be used, or external storage may be used over the network 1.

The multi-function device 40 used by a user who desires to purchase print data (a card) includes a purchase processor 41 and a print execution unit 42. The purchase processor 41 transmits a purchase request to the management server 10 in response to a purchase instruction operation by the user, and also acquires print data and embedded information transmitted from the management server 10 in response to the purchase request. The print execution unit 42 operates in conjunction with the printer engine 76 to execute the printing of print data acquired by the purchase processor 41. The purchase processor 41 and the print execution unit 42 are realized by cooperative action between the computer onboard the multi-function device 40 and a program running on the CPU 71 installed in the computer.

The multi-function device 50 used by a user who receives printed matter includes an authenticity query unit 51 and a display 52. The authenticity query unit 51 queries the management server 10 about whether or not scanned printed matter is genuine in response to a user operation, and also acquires information transmitted back from the management server 10 in reply to the query. The display 52 provides information to the user by displaying information acquired by the authenticity query unit 51 on the operating panel 73. The authenticity query unit 51 and the display 52 are realized by cooperative action between the computer onboard the multi-function device 50 and a program running on the CPU 71 installed in the computer.

The user terminal 20 used by a user who is the owner of printed matter includes a seller processor 21 that executes a trade process for the seller side when the user wants to sell printed matter that he or she currently owns. The seller processor 21 is realized by cooperative action between the computer that forms the user terminal 20 and a program running on the CPU 61 installed in the computer.

The user terminal 30 used by a user who wants to receive a transfer of printed matter includes a buyer processor 31 that executes a trade process for the buyer side that buys printed matter. The buyer processor 31 is realized by cooperative action between the computer that forms the user terminal 30 and a program running on the CPU 61 installed in the computer.

In addition, a program used in the exemplary embodiment obviously may be provided via a communication medium, and may also be provided by being stored on a computer-readable recording medium such as CD-ROM or USB memory. A program provided from a communication medium or a recording medium is installed onto a computer, and various processes are realized by having the CPU of the computer sequentially execute the program.

Next, operations according to the exemplary embodiment will be described. First, a process in which a user who desires to purchase print data uses the multi-function device 40 to purchase and print out print data will be described with reference to the flowchart illustrated in FIG. 7.

The purchase processor 41 is activated as a result of a person who desires to make a purchase performing a certain operation for purchasing print data from the operating panel 73. The purchase processor 41, when activated, transmits to the management server 10 an acquisition request for a purchase screen that displays a list of print data (card types) for sale by the management server 10 (step 401). The sale processor 11 in the management server 10 transmits a purchase screen in response to the transmitted acquisition request (step 101). Note that even in this purchase flow, in the case of a region-specific product (such as a content print service) as discussed earlier, a step of confirming the position information of the purchaser (multi-function device 40) may be added.

After the purchase screen is transmitted back in reply to the transmitted acquisition request, the purchase processor 41 displays the purchase screen on the operating panel 73 (step 402). When the user selects desired print data to purchase from the list display, and then issues a purchase instruction after inputting certain items to be discussed later, the purchase processor 41 issues a purchase request in response to the instruction by transmitting to the management server 10 purchase request information including the selected print data and the input items (step 403). The purchase request information includes the user ID of the person who desires to make a purchase, and this user ID may be input into the purchase screen by the person who desires to make a purchase, or may be specified from a login screen or the like when the user starts using the multi-function device 40.

The sale processor 11 in the management server 10 references the remaining number available to print in the attribute information of the relevant card type stored in the attribute information storage 14, and confirms that the relevant card type is salable. Subsequently, the sale processor 11 generates individual attribute information (step 102). In other words, the sale processor 11 automatically issues a new individual card ID, and sets the print order by referencing the serial number or the remaining number available to print. Additionally, the sale processor 11 sets the user ID included in the purchase request information as the owner ID, and sets the time at which the purchase request was received as the print time. The print location is set to the installation location of the multi-function device 40 included in the purchase request information from the multi-function device 40. FIG. 6 illustrates an example in which information indicating a comparatively broad region, namely "Tokyo", is set, but this is merely one example, and the print location may also be information that further constrains the geographical region, such as "Roppongi", or latitude and longitude information. If the user input a password into a certain password setting field on the purchase screen, the input password is set as the password. After setting an attribute value for each of the above attribute items, the sale processor 11 generates embedded information including the attribute item values to embed, and sets the embedded information in the individual attribute information. Additionally, the sale processor 11 subtracts 1 from the remaining number available to print in the common attribute information.

After the individual attribute information generated as above is newly registered in the attribute information storage 14, and the remaining number available to print is updated, the sale processor 11 subsequently registers transfer information in the transfer information storage 16 in accordance with the sale of a card (step 103).

FIG. 8 is a diagram illustrating an example of the data structure of transfer information registered in the transfer information storage 16 according to the exemplary embodiment. The transfer information includes a transfer time, a card ID, a transferrer, a transferee, and transaction information. The transfer time is time information about when the card is transferred, while the card ID is the card ID of the transferred card. The user ID of the user from which the card is transferred is set as the transferrer, while the user ID of the user to which the card is transferred, or in other words the new owner, is set as the transferee. The transaction information will be described later, but is set with transaction information that is set for the relevant card when the transfer is established. In this case, since the card is being sold as new, the sale processor 11 sets the identification information of the management server 10 as the transferrer, and sets the user ID of the user using the multi-function device 40 as the transferee, like in the record 3 illustrated in FIG. 8. Note that transaction information is not set at the time of sale. In this way, the transfer history of the same card may be checked by a user or an administrator.

According to the record 3 illustrated as an example in FIG. 8, a user A who newly purchases a card A becomes the first owner of the card A. After that, the record 5 indicates that the card A is sold by the user A to a user F. According to the exemplary embodiment, when a transferrable object is transferred, a history of the transfer is registered in the transfer information storage 16, thereby making it possible to track the transfer history of a transferrable object by tracing back through the recorded content in the transfer information storage 16.

After the setting and registration of various information as above is finished, the sale processor 11 retrieves print data from a certain storage location (not illustrated), and replies to the multi-function device 40 with the print data together with the embedded information (step 104).

When the print data and the embedded information is transmitted in response to a purchase request, the purchase processor 41 passes the received information to the print execution unit 42. The print execution unit 42 forms watermark information from the embedded information, embeds the watermark information into the print data, and executes printing (step 404).

In this way, the person who desires to make a purchase acquires the card (printed matter) desired for purchase. Note that terms of payment are not part of the gist of the exemplary embodiment, and thus are omitted from description.

As discussed above, in the exemplary embodiment, attribute information is described as being embedded into printed matter as watermark information, but the attribute information is not necessarily required to be embedded as watermark information. For example, attribute information may also be added to printed matter by using a visible data code, such as a QR Code (registered trademark). Additionally, the position where the attribute is added may be set appropriately depending on the type of printed matter, such as on the back face. Also, the information to embed into printed matter may also not be the attribute information itself, but instead be information such as a card ID that uniquely specifies attribute information in the management server 10.

Figure 9:
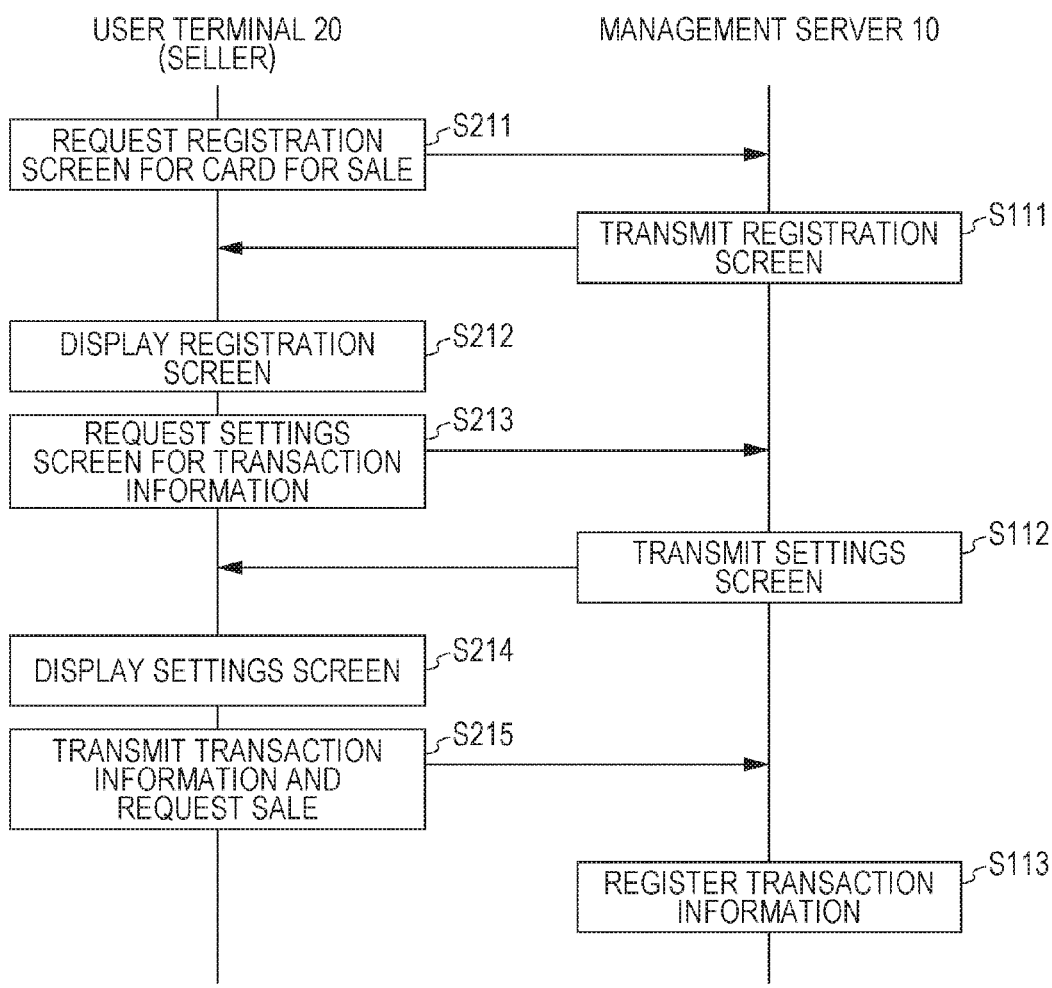
FIG. 9 is a flowchart illustrating a flow of a process when an owner desires to sell a transferrable object according to an exemplary embodiment.

Meanwhile, in some cases, a user who has purchased a card may choose to relinquish the card for some reason. In other words, in some cases, a user may desire to sell a card to a third party. On the other hand, there may be a person who wants to buy a rare card. Hereinafter, a process in which a user who wants to sell a card registers information related to the sale of the card in the management server 10 will be described with reference to the flowchart illustrated in FIG. 9. Note that, as discussed earlier, the description herein supposes that the user terminal 20 is used by the user who wants to sell the card, while the user terminal 30 is used by the user who wants to buy the card. Also, in the description herein, the user who wants to sell the card is designated the "seller" or the "owner". Meanwhile, the user who wants to buy is designated the "buyer" or the "person who desires to buy", and after buying, is designated the "new owner".

The seller, after logging in to the user terminal 20, activates the seller processor 21 by performing a certain operation. The seller processor 21, when activated, transmits to the management server 10 a registration screen acquisition request that includes the user ID of the relevant user (step 211). The trade agent processor 12 in the management server 10 references the transfer information in response to the transmitted acquisition request, and generates and transmits a registration screen that includes a list of cards that the relevant user owns (step 111).

After the registration screen is transmitted back in reply to the transmitted acquisition request, the seller processor 21 displays the registration screen on the display (step 212). On the registration screen, a list of names and the like of the cards that the relevant user owns is displayed, and thus the seller selects a desired card to sell this time from the list. After a card is selected, the seller processor 21 transmits to the management server 10 an acquisition request for a transaction information settings screen, including the card ID of the desired card to sell (step 213). The trade agent processor 12 in the management server 10 transmits the settings screen in response to the transmitted acquisition request (step 112).

After the settings screen is transmitted back in reply to the transmitted acquisition request, the seller processor 21 displays the settings screen on the display (step 214). Subsequently, the seller sets transaction information by selecting or inputting information relevant to the sale from the displayed transaction information settings screen.

FIG. 10 is a diagram illustrating an example of the data structure of transaction information handled in the exemplary embodiment. In the transaction information, there is set information related to the card that the seller wants to sell, as well as information related to the sale of the card. The information set as the information related to the card includes the card ID, the owner ID, contact information, and the print order of the relevant card. In addition, the appearance of the card is input subjectively by the seller or an image thereof taken by the seller is uploaded to a server or the like, and a result of determining the preservation condition of the card by a certain image determination process is set as the preservation condition of the relevant card. Meanwhile, the information set as the information related to the sale includes a desired sale price, delivery availability after purchase, a payment method, whether to reveal or hide the name of the seller, a transaction condition, and an acquisition route. Note that although FIG. 10 illustrates an example in which the desired sale price is specified as a range, it is not necessarily required to specify the desired sale price as a range. For the acquisition route, the information in the transfer information storage 16 stored in the management server 10 may also be referenced, depending on the demand on the buyer side and the range of how much to reveal on the seller side. The above settings are merely an example. The items of the settings are not limited to the above, and may be set appropriately depending on the type and characteristics of the transferrable object.

After the seller sets and inputs transaction information for the card as above, the seller processor 21 accepts and transmits the information to the management server 10 to thereby request the sale of the card (step 215).

The trade agent processor 12 in the management server 10, upon accepting the sale request, registers the information transmitted attached to the request in the trade management information storage 15 (step 113).

Figure 11A:
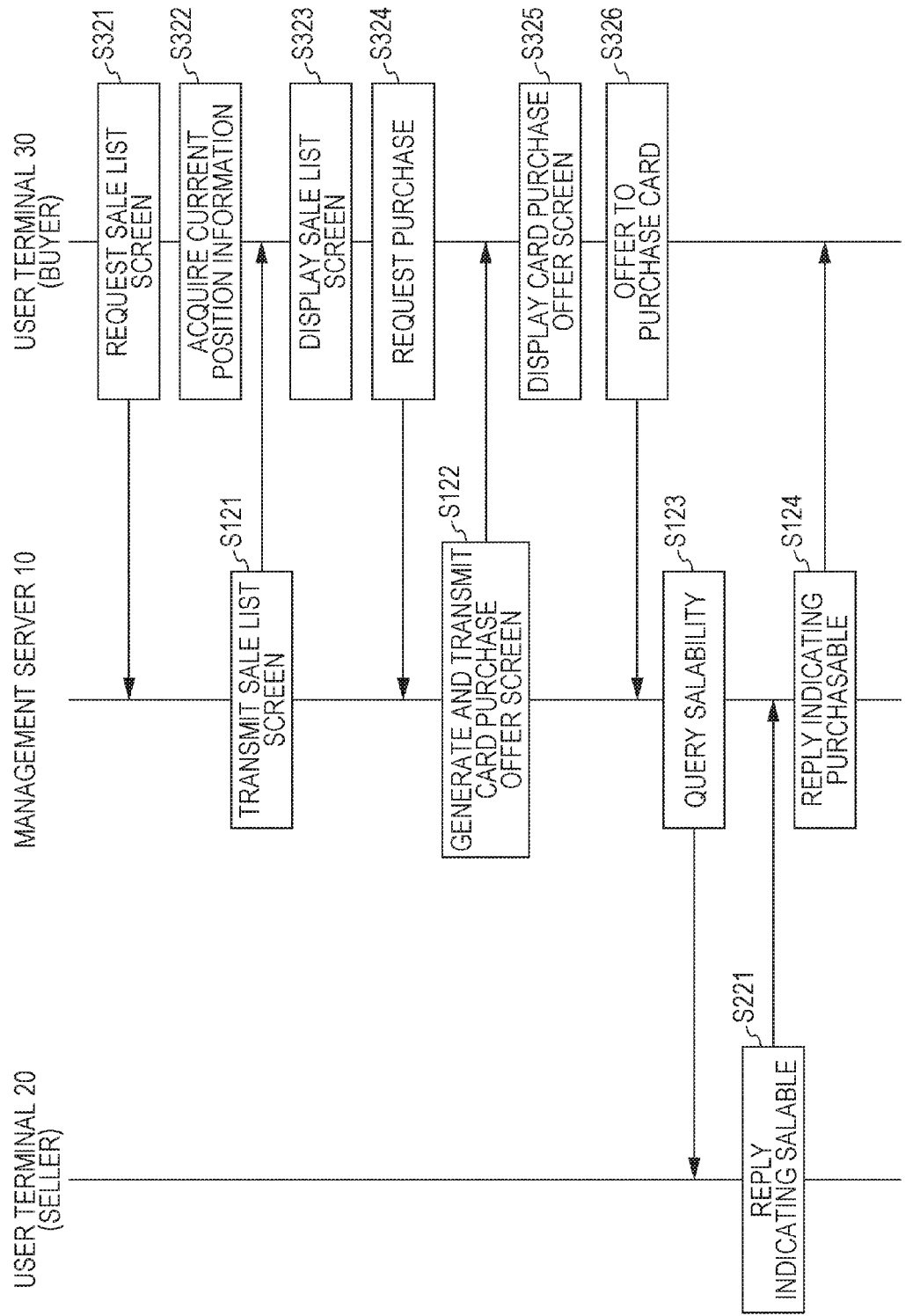
FIG. 11A is a flowchart illustrating a flow of a process when a transferrable object is traded according to an exemplary embodiment.

Next, a buying process in which the buyer searches for and purchases a desired card to buy will be described with reference to the flowchart illustrated in FIG. 11.

The person who desires to buy, after logging in to the user terminal 30, activates the buyer processor 31 by performing a certain operation for buying a card. The buyer processor 31, when activated, transmits to the management server 10 an acquisition request for a sale list screen that displays a list of card types available for sale (step 321). Additionally, the buyer processor 31 detects the installation position of the user terminal 30 (current position information about the person who wants to buy), independently of the acquisition of the sale list screen (step 322). If the user terminal 30 is equipped with a GPS function, position information may be acquired from the GPS function, or the user may be prompted to input and specify position information.

The trade agent processor 12 in the management server 10 references the transaction information registered in the trade management information storage 15 in response to the transmitted acquisition request, and generates and transmits a sale list screen that includes a list of card types available for sale (step 121).

After the sale list screen is transmitted back in reply to the transmitted acquisition request, the buyer processor 31 displays the sale list screen on the display (step 323). On the sale list screen, a list of information such as the names and sample images of card types available for sale is displayed, and if the buyer selects a desired card to buy from the list display and gives an instruction to acquire transaction information, the buyer processor 31 issues a purchase request that includes the common card ID of the selected card type (step 324). At this point, search conditions may also be input and specified to filter the card types to display. Also, a purchase request is issued by additionally transmitting information relevant to judging whether or not the person who desires to buy is a user matching the buy conditions for the card type. For example, if there is an owner who desires to sell only to residents of a metropolitan area, the buyer processor 31 transmits the current position information of the person who desires to buy included in an acquisition request.

The trade agent processor 12 in the management server 10, in response to the transmitted purchase request, retrieves from the attribute information storage 14 the attribute information corresponding to the common card ID included in the purchase request, and also retrieves from the trade management information storage 15 the transaction information of each card corresponding to the common card ID. Subsequently, the trade agent processor 12 generates and transmits to the user terminal 30 a card purchase offer screen based on the retrieved information (step 122).

After the card purchase offer screen is transmitted back in reply to the transmitted purchase request, the buyer processor 31 displays the card purchase offer screen on the display (step 325).

Figure 12:
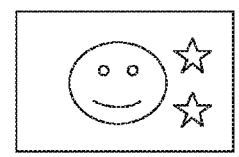
FIG. 12 is a diagram illustrating an example display of a card purchase offer screen according to an exemplary embodiment.

FIG. 12 is a diagram illustrating an example display of the card purchase offer screen displayed on the user terminal 30. On the left side of the card purchase offer screen, a sample image of the card is displayed, and below that, the card name and the number of printed copies are displayed. In the number of printed copies, the maximum number available to print and the number already printed for the relevant card are displayed. In the case in which 10 out of 10 have already been printed as illustrated in the example of FIG. 12, the message "Printing Ended" is additionally displayed to indicate clearly that further printing is not available.

To the right of the sample image, a list of owners of the relevant card and the transaction conditions presented by each owner are displayed in correspondence with each other. At this point, the buyer may also be able to specify conditions for filtering the owners to display in the list. The buyer processor 31 may display the card purchase offer screen by filtering down to only information corresponding to relevant cards based on the filter conditions. Alternatively, the trade agent processor 12 that receives the filter conditions may generate and transmit a card purchase offer screen in which the transaction information is filtered based on the filter conditions. The filter conditions may be, for example, owners who ship within three days, or only cards with sharp printing.

The buyer refers to the information displayed on-screen to select an owner (seller) requesting a sale. Note that although FIG. 12 illustrates an example of displaying only transaction conditions, if the name of an owner is selected, all or part of the transaction information set by the relevant owner may also be displayed. The buyer refers to such information, and selects the "Offer" button corresponding to the selected owner.

Note that in the exemplary embodiment, owners who do not desire to sell are also listed on the card purchase offer screen. However, in this case, it is desirable to hide the owner ID, and also not display the "Offer" button to avoid accidental selection. Obviously, it is also possible to list only owners who desire to sell.

After the "Offer" button is selected, the buyer processor 31 offers to purchase the card by transmitting to the management server 10 offer information that includes contact information, such as the email address of the person who desires to buy (step 326).

The trade agent processor 12 in the management server 10, upon receiving the offer information, queries whether or not the relevant card is salable by transmitting a purchase offer notification via email or the like to the contact information acquired from the transaction information of the owner corresponding to the "Offer" button (step 123).

After the user terminal 20 receives the query about salability, the seller indicates acceptance of the sale in response to the query. The seller processor 21 replies with an indication of salability according to the seller's operation indicating acceptance (step 221). Note that in the case of refusing the sale, a reply indicating refusal is transmitted in reply, the person who desire to buy is notified that his or her offer was refused, and the process ends.

The trade agent processor 12, upon receiving a notification of salability from the user terminal 20, responds to the offer from the user terminal 30 by transmitting an email message or the like indicating that the offer is accepted (step 124).

Subsequently, the person who desires to buy is able to refer to the transmitted email message to learn that buying the desired card is possible.

In this way, after confirming that the person who desires to buy is able to purchase the desired card, the seller ships the card (printed matter) to the person who desires to buy. Note that information about the shipping destination of the card may be included in the query to inform the seller.

After that, when the person who desires to buy acquires the card (printed matter) shipped from the seller, the person who desires to buy performs a certain operation to report acquisition of the card from a certain completion report screen. The buyer processor 31 reports receipt completion according to this operation (step 327). At this point, the buyer who has become the new owner sets a password if he or she desires to set a password. The buyer processor 31 transmits the password included in the receipt completion notification.

After receiving the receipt completion notification, the trade agent processor 12 updates the following information in accordance with the change of owner. In other words, the trade agent processor 12 updates the attribute information (step 125). Specifically, the owner ID included in the individual attribute information of the relevant card is updated to the user ID of the new owner. Also, if a password is set by the new owner, the password is overwritten by the newly set password. If the new owner has not set a password, the existing password is deleted. Additionally, embedded information including the updated attribute values is generated and set in the individual attribute information.

Also, the trade agent processor 12 registers transfer information in the transfer information storage 16 in accordance with the change of owner (step 126). Specifically, the time at which the receipt completion notification was received is set as the transfer time, the individual card ID is set as the card ID, the user ID of the seller is set as the transferrer, and the user ID of the new owner is set as the transferee. Also, since the transaction information is deleted in a subsequent process, the transaction information of the relevant card that had been set when the trade was established may also be saved. In this way, the record 4 illustrated as an example in FIG. 8 is set and registered. Subsequently, since the new owner does not yet desire to sell, the trade agent processor 12 deletes the transaction information of the relevant card from the trade management information storage 15 (step 127). Note that the above information updating process is not required to be conducted in the above order.

In the exemplary embodiment, the transfer of a card is conducted over the network 1, with intermediating agency by the management server 10 as described above. Note that a process for payment is not part of the gist of the exemplary embodiment, and thus is omitted from description.

According to the exemplary embodiment, the trade of a card is conducted over the network 1 as above, and even if the owner of a card (printed matter) changes, it is still possible to check the current owner of the card by referencing the transfer information, thereby ensuring traceability.

Also, although not mentioned specifically in the above description, the current position of the buyer is acquired in step 322, thus enabling support for cases in which it is desirable to limit a transferrable object to a geographical region. In other words, it is possible to refuse an offer based on the current position of the buyer.

Figure 13:
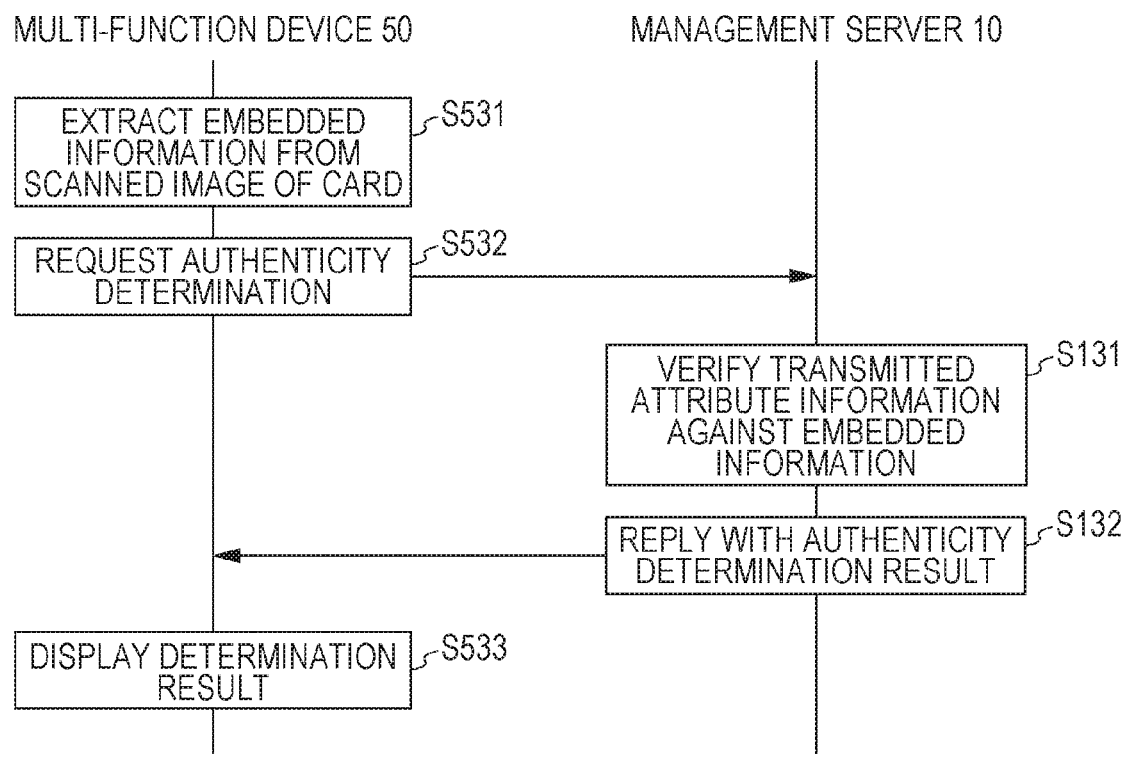
FIG. 13 is a flowchart illustrating a flow of a process when an authenticity determination of a transferrable object is conducted according to an exemplary embodiment.

Meanwhile, in some cases, the buyer (new owner) may want to check whether or not the received card is genuine, either before or after issuing the receipt completion notification (step 327). In this case, the new owner uses the multi-function device 50 to request the management server 10 for an authenticity determination. The authenticity determination process will be described with reference to the flowchart illustrated in FIG. 13.

The new owner sets an authenticity determination mode by performing a certain instruction operation on the multi-function device 50. As a result, the authenticity query unit 51 is activated. Note that by demanding the input of the owner ID and the password when the certain instruction operation is performed, the multi-function device 50 may also be configured not to accept a request for an authenticity determination from a person other than the new owner.

If the new owner places the card to subject to an authenticity determination on the scanner platen of the multi-function device 50, and performs a certain operation, the authenticity query unit 51 scans the card, and extracts the embedded information embedded in the card from the scanned image (step 531). Subsequently, the authenticity query unit 51 issues an authenticity determination request by transmitting to the management server 10 attribute information obtained by deciphering the embedded information as printed matter information scanned from the card (step 532). Note that the scanned image itself may also be transmitted to the management server 10, and the deciphering of the embedded information may be conducted on the management server 10 side.

After receiving the authenticity determination request, the authenticity determination unit 13 in the management server 10 verifies the attribute information included in the authenticity determination request against the embedded information set in the individual attribute information of the relevant card registered in the attribute information storage 14 (step 131).

If the verification result is a match, the authenticity determination unit 13 determines that the card scanned by the multi-function device 50 is genuine. If not a match, the card is determined to be counterfeit. Subsequently, the authenticity determination unit 13 replies to the multi-function device 50 with the determination result (step 132). In the case of replying with a determination result that the card is genuine, the attribute information may also be transmitted as well.

After the authenticity query unit 51 in the multi-function device 50 acquires the determination result from the management server 10, the display 52 displays the determination result on the operating panel 73 (step 533). At this point, if attribute information was also received, the attribute information may be displayed together with the determination result.

Note that as discussed earlier, in the exemplary embodiment, attribute information is embedded into the card as embedded information, and the authenticity query unit 51 requests an authenticity determination by transmitting the attribute information as printed matter information. However, it is also possible to transmit only the individual card ID as the printed matter information, and if the authenticity determination unit 13 successfully extracts attribute information corresponding to the transmitted individual card ID from the attribute information storage 14, the card may be determined to be genuine. In the case of conducting such an authenticity determination based on the individual card ID, the sale processor 11 may generate only the individual card ID rather than the attribute information as the embedded information when the card is sold.

As described above, in the exemplary embodiment, print data that has been printed out by the multi-function device 40 is described as an example of a transferrable object, but the transferrable object is not required to be limited to electronic data such as print data traded over the network 1. In other words, in cases in which the transferrable object is a physical good, the exemplary embodiment is still applicable, and only the distribution channel of the physical good at the time of purchase is different. For example, the exemplary embodiment is applicable to transfer transactions for objects offered on Internet auctions and mail-order systems. In such cases, the attribute information discussed above is managed as a trade history of the product offered. Consequently, attribute information including information useful for identifying the transfer source or the like of a transfer transaction over a variety of networks is managed, thereby enabling easy authenticity determination, and also enabling a user to easily make a suitable value judgment of the target object of the transfer transaction.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device, comprising:
at least one hardware processor configured to implement:
   a linker that links respective identification information of one or more persons and an object involved in a transfer established using a network;
   an updater that updates the respective identification information for a subsequent transfer transaction; and
   a converter that converts the respective identification information into a format usable for the subsequent transfer transaction and such that the respective identification information indicates a plurality of transfer transactions of the object,
wherein the respective identification information indicates a first number of times that the object is printed in response to a first transfer transaction and a second number of times that the object is printed in response to the subsequent transfer transaction.

2. The information processing device according to claim 1, wherein
if a transfer of the object is established using a network, the updater updates generated attribute information stored in a memory in correspondence with the respective identification information of the object, the attribute information including at least one of an order in which the object has been transferred from among transferrable objects of the same type, each owner of the object, each transfer time, and each transfer location.

3. The information processing device according to claim 2, wherein the attribute information includes a maximum number available to transfer and a remaining number available to transfer for objects of the same type, and
wherein the at least one hardware processor further comprises:
   a prohibitor that prohibits a transfer exceeding the maximum number available to transfer for objects of the same type.

4. The information processing device according to claim 2, wherein the at least one hardware processor is further configured to implement:
an authenticity determiner that, if the object is printed matter, determines an authenticity of the printed matter in response to a query including printed matter information scanned from the printed matter, by verifying the printed matter information against the attribute information stored in the memory.

5. The information processing device according to claim 2, wherein the at least one hardware processor is further configured to implement:
a replier that, if the object is printed matter, replies, in response to a query including printed matter information scanned from the printed matter, to a source of the query with the attribute information of the printed matter extracted from the memory based on the printed matter information.

6. The information processing device according to claim 1, wherein the at least one hardware processor is further configured to implement:
a presenter that, if the object is printed matter, presents, to a person who desires to receive a transfer, transaction information including at least a preservation condition of the printed matter presented by a person who desires to transfer the printed matter.

7. The information processing device according to claim 1, wherein the at least one hardware processor is further configured to implement:
an acquirer that acquires position information of a person who desires to transfer the object; and
a permitter that permits a transfer to only a person who desires to receive a transfer in a geographical region matching a transfer condition of the object.

8. The information processing device according to claim 1, wherein
the one or more persons involved include at least a transferee of the transfer.

9. The information processing device according to claim 1, wherein
the respective identification information is information that identifies a transfer source of the object.

10. The information processing device according to claim 1, wherein
if conversion of the respective identification information fails, the converter notifies a user.

11. The information processing device according to claim 1, wherein the plurality of transfer transactions of the object comprise respective identification information indicating ones of the first transfer transaction and the subsequent transfer transaction,
wherein the respective identification information indicates that the first transfer transaction comprises a first transferrer, a first transferee and a first transfer time at which the object is transferred from the first transferrer to the first transferee, and
wherein the respective identification information further indicates that the subsequent transfer transaction comprises a second transferrer, a second transferee and a second transfer time at which the object is transferred from the second transferrer to the second transferee,
wherein the first transferee is the second transferrer.

12. A transfer system, comprising:
a management server that manages an object to transfer; and
a user terminal used by a person who desires to receive a transfer, wherein
the management server includes at least one hardware processor configured to implement:
   a linker that, if the object is transferred according to a transfer request from the user terminal over a network, links respective identification information of one or more persons and the object involved in the transfer,
   an updater that updates the respective identification information for a subsequent transfer transaction, and
   a converter that converts the respective identification information into a format usable for the subsequent transfer transaction and such that the respective identification information indicates a plurality of transfer transactions of the object, wherein the respective identification information indicates a first number of times that the object is printed in response to a first transfer transaction and a second number of times that the object is printed in response to the subsequent transfer transaction.

13. An information processing method, comprising:

linking respective identification information of one or more persons and an object involved in a transfer established using a network;

updating the respective identification information for a subsequent transfer transaction; and converting the respective identification information into a format usable for the subsequent transfer transaction and such that the respective identification information indicates a plurality of transfer transactions of the object, wherein the respective identification information indicates a first number of dines that the object is printed in response to a first transfer transaction and a second number of times that the object is printed in response to the subsequent transfer transaction.

14. A non-transitory computer-readable medium storing a program causing a computer to execute a process for processing information, the process comprising:

linking respective identification information of one or more persons and an object involved in a transfer established using a network;

updating the respective identification information for a subsequent transfer transaction; and converting the respective identification information into a format usable for the subsequent transfer transaction and such that the respective identification information indicates a plurality of transfer transactions of the object, wherein the respective identification information indicates a first number of times that the object is printed in response to a first transfer transaction and a second number of times that the object is printed in response to the subsequent transfer transaction.

* * * * *